Patented July 6, 1954

2,683,133

UNITED STATES PATENT OFFICE 2,683,133

ACETONE FORMALDEHYDE RESIN

Mortimer T. Harvey, South Orange, and Peter L. Rosamilia, Bloomfield, N. J., assignors to Harvel Research Corporation, a corporation of New Jersey No Drawing. Application June 14, 1949,
Serial No. 99,114

8 Claims. (Cl. 260—64)

This invention relates to novel compositions of matter and to methods for producing them. In one of its more specific aspects the invention is directed to novel thermosetting resinous water soluble reaction products of acetone and formaldehyde, to novel water insoluble resins produced by converting said water soluble resinous products to the infusible state under alkaline conditions and also to the novel methods for producing the various novel resinous products.

Heretofore, it has been proposed to react acetone and formaldehyde in various molecular proportions, and under various conditions of alkalinity and temperatures to produce certain resinous products thereof which have been water soluble, water insoluble and infusible depending upon the conditions and proportions during reaction.

In the course of experimentation, it has been discovered that highly useful water soluble and stable resins may be produced in comparatively high yields, at relatively low cost and in foolproof and danger-proof factory production by reacting acetone and formaldehyde under controlled conditions and that such water soluble resins soluble in at least twice their volume of water may be converted to the infusible state in the presence of an alkaline reagent to provide infusible resins, which are dense, hard, firm and insoluble in water, acetone, petroleum spirits, aromatic spirits, etc. and are unaffected by alkalies and dilute acids.

According to one of the aspects of this invention in factory production, acetone and formaldehyde are placed in a reacting vessel to provide a charge thereof in the proportion of one mole of acetone to three to five moles of formaldehyde. The formaldehyde is preferably in aqueous solution of any desired concentration generally determined by its concentration in the available solution of commerce. The reaction of the acetone and formaldehyde is carried out with the aid of an alkaline catalyst and those which are preferred are the strongly alkaline agents, such as sodium hydroxide, potassium hydroxide, calcium hydroxide, potassium carbonate, sodium carbonate, etc. These strongly alkaline agents are of such a nature as to be capable of providing an exothermic reaction between the acetone and formaldehyde after the reaction has been initiated by the aid of external heat. The reaction is carried out at temperatures in the range of 160–210° F. and preferably in the range of 175–205° F. until the quantity by weight of the water soluble resin produced measures at least 75% of the combined weights of the acetone and formaldehyde in the original charge. The quantity of alkaline agent employed is within the range of that necessary to produce said minimum percentage of water soluble thermosetting resin content but less than that required to produce a solid infusible resin content measuring more than 5% of the combined weights of the acetone and formaldehyde in the original charge.

When the mole ratio of the acetone to the formaldehyde in the charge is one to three, the quantity by weight of sodium hydroxide employed is less than 4%, generally 1%–3% and preferably approximately 2% of the combined weights of acetone and formaldehyde in the charge; when the mole ratio of the acetone to the formaldehyde in the charge is one to four, the quantity by weight of sodium hydroxide employed is less than 5%, generally 1.5–4% and preferably approximately 2.5% of the combined weights of acetone and formaldehyde in said charge; when the mole ratio of acetone to the formaldehyde in the charge is one to 5, the quantity by weight of sodium hydroxide employed is less than 7.75%, generally 2%–6% and preferably approximately 4% of the combined weights of acetone and formaldehyde in said charge. Of course instead of employing sodium hydroxide, the alkaline equivalent of any other strongly alkaline reagent may be used.

The sodium hydroxide or other alkaline reagent is preferably first dissolved in a solvent such as water and the alkaline reagent is added to the charge as a solution. For best results, the solution of alkaline reagent should not be added all at one time. It may be added in increments, the amounts of which are dictated or controlled by the speed of reaction desired. After the charge of acetone and formaldehyde is contained in the reaction vessel, the aqueous solution generally 50% concentration of the sodium hydroxide or other alkaline reagent is made up in a separate container, with the amount of reagent dependent upon the mole ratio of acetone to formaldehyde in the charge. The aqueous alkaline solution is divided into three or four equal parts. One part is then added to the acetone and formaldehyde charge which is constantly stirred throughout the entire process. After this addition, the mass is externally heated to a temperature of 120–130° F. The heat is shut off and the mass exothermically reacts and its temperature rises and by the use of cooling water in the jacket of the reaction vessel, its temperature is allowed to rise to approximately 200° F. Then its temperature goes down to approximately 175° F. whereupon the second quarter of the alkaline solution is added. Again the temperature rises and is allowed to rise to 200° F. and falls to 175° F. The third quarter of the alkaline solution is added and again the temperature rises and is allowed to rise to 200° F. and falls to 175° F. The last quarter of the alkaline solution is added and again the temperature rises and is allowed to rise to 200° F. and then falls to 140° F. whereupon the cooling water is shut off. Then the mass may be maintained in the state of boiling under a reflux condenser for ½ to 1 hour if desired and then allowed to cool to 140° F. Either with or without the boiling under reflux, vacuum is now gradually applied in the reaction vessel to remove some of the water and to cause cooling of the mass until the temperature of the mass is lowered to 105° F–110° F. At this point a 28–29″ vacuum is applied and dehydration is continued until a solution of the desired percentage of solids is obtained or until the resin is substantially anhydrous. In either case the resin produced is liquid, water soluble and thermosetting and measures at least 75% of the combined weights of the acetone and formaldehyde in the original charge.

The following as examples of methods for producing the novel products are given merely by way of illustration and not in a limiting sense.

*Example 1 (1 mole acetone-4 moles of formaldehyde)*

300 lbs. acetone
1700 lbs. formaldehyde (37% concentration)
25 lbs. NaOH in
60 lbs. water The caustic soda-water solution was divided into four equal portions. The unit was loaded with acetone and formaldehyde with the steam on and stirring equipment in operation and the material was heated to 120–125° F. The first portion of caustic soda-water solution was added and the steam cut off. As the temperature rises to 130° F. and the cold water is turned on, an exothermic reaction takes place and the temperature slowly rises to 200° F. then slowly begins to fall. At 185° F. the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on keeping the vent open. The vent is slowly closed and the steam turned on. Dehydration may be continued to produce a resin of 75%–100% solids. The amount of resin produced measured more than 75% of the combined weights of the acetone and formaldehyde in the original charge. The resin was amber colored, is stable for at least 6 months at 30° C., cures in 2 hours at 140° C., cures within 4 hours upon adding 5% lime thereto and cures within 2½ hours upon adding 10% lime thereto. Upon addition of 2%, 5% and 10% lime thereto it will cure in 60, 10 and 3–5 minutes respectively at temperatures of 140° F.

*Example 2 (1 mole of acetone-3 moles of formaldehyde)*

30 parts of acetone
126 parts formaldehyde (37% concentration)
2 parts NaOH in
4 parts water The caustic soda-solution was divided into three equal portions. Using the same procedure as that set forth in Example 1, the resultant resinous product produced was amber colored and measured more than 75% of the combined weights of acetone and formaldehyde in the original charge. The resin was soluble in water in up to 200% dilution and insoluble in 600% dilutions in water. 50 parts of this resin mixed with 5 parts of lime was converted to the solid state at room temperature after about ½ hour which on standing becomes hard, firm, infusible and insoluble in acetone, petroleum spirits, aromatic spirits and chlorinated solvents, also unaffected by alkalies and dilute acids.

*Example 3 (1 mole of acetone-5 moles of formaldehyde)*

30 parts of acetone
212 parts formaldehyde (37% concentration)
4 parts NaOH in
8 parts water Employing the same procedure as that set forth in Example 1, except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin was an amber colored viscous mass infinitely soluble in water and measuring more than 75% of the combined weight of acetone and formaldehyde in the original charge.

In another of its specific aspects, the water soluble resins of this invention, illustrations of which are shown in Examples 1–3, may be converted to the infusible state under alkaline conditions. They may be employed as casting resins by merely adding an alkaline substance such as lime thereto, pouring into a mold and allowing to set at either room or elevated temperatures.

They may be used as bonding agents and binders for wood, glass, cotton, paper, felt or the like. A cheap and convenient method is to add 5 parts of lime to 50 parts of the water soluble resin and mix them together, then spread the mix on a wood surface, place another layer of wood or other surface thereover and maintain them under pressure for about 20 hours. Pressure is then removed and the laminated product is allowed to remain undisturbed for one to ten days to provide a strongly bonded lamination or the like.

They may be mixed with various other fillers and alkaline materials and then cured to provide chemically resistant vessels, conduits, etc.

They may be used as bonding and binding agents in the abrasive field. They may be mixed with abrasive particles and lime and the mixture cured to provide strong abrasive wheels. For this purpose they may be mixed with lime in the proportion of 50 parts of the resin to 2–5 parts of lime. This mix is spread on a paper backing and then onto the tacky mix is sprinkled a quantity of sand or other abrasive particles which are embedded therein. This is cured up to 300° F. to provide a tough bonded sandpaper.

This may also be accomplished by first spreading the resin on the paper backing, then spreading a mixture of lime and abrasive particles thereon and curing.

They may be coated on freshly plastered or cemented walls, the alkali in the plaster or cement aiding in the setting or curing of the resin. In such application they act as sizers far superior to shellac, linseed oil, etc. on which painting with ordinary paints may be done.

They may be mixed with cement, plaster of Paris, asbestos, etc. or other alkaline substances and cured to provide a wide variety of useful water resistant products.

They may be used as electrical impregnating resins for coils, such as transformers, motors, etc. and also as pothead filling compounds and oil proof seals for cables.

They may also be used for oil well plugs; in such a use a mixture of 100 parts of Portland cement and 70 parts of one of said resins in 30 parts of water may be employed.

Having thus described the invention it is claimed:

1. The process for producing a resinous reaction product which comprises reacting under aqueous conditions, acetone and formaldehyde with the mole ratio of acetone to formaldehyde being 1 mole of acetone to about 3 to about 5 moles of formaldehyde, said reactants having a strongly alkaline reagent added thereto, said reaction after initiation upon the application of external heat proceeding exothermically due to the addition of a sufficient quantity of said agent thereto, said exothermic reaction reaching temperatures in the range of 160–210° F., the total amount of said agent employed being approximately the alkaline equivalent of sodium hydroxide measuring 1 to 3% of the combined weights of said acetone and formaldehyde when the mole ratio of acetone to formaldehyde is 1 to 3, 1.5 to 4% of the combined weights of acetone and formaldehyde when the mole ratio of acetone to formaldehyde is 1 to 4, and 2 to 6% of the combined weights of acetone and formaldehyde when the mole ratio of acetone to formaldehyde is 1 to 5, the resinous reaction product produced thereby being thermosetting, measuring by weight at least 75% of the combined weights of acetone and formaldehyde and being soluble in twice its volume of water.

2. The process for producing a resinous reaction product which comprises reacting under aqueous conditions, acetone and formaldehyde with the mole ratio of acetone to formaldehyde being 1 mole of acetone to about 4 moles of formaldehyde, said reactants having a strongly alkaline reagent added thereto, said reaction after initiation upon the application of external heat proceeding exothermically due to the addition of a sufficient quantity of said agent thereto, said exothermic reaction reaching temperatures in the range of 160–210° F., the total amount of said agent employed being approximately the alkaline equivalent of sodium hydroxide measuring 1.5 to 4% of the combined weights of acetone and formaldehyde when the mole ratio of acetone to formaldehyde is 1 to 4, the resinous reaction product produced thereby being thermosetting, measuring by weight at least 75% of the combined weights of acetone and formaldehyde and being soluble in twice its volume of water.

3. A product made according to claim 1.

4. A product made according to claim 2.

5. The process for producing a resinous reaction product which comprises reacting under aqueous conditions, acetone and formaldehyde with the mole ratio of acetone to formaldehyde being 1 mole of acetone to about 4 moles of formaldehyde, said reactants having a strongly alkaline reagent added thereto, said reaction after initiation upon the application of external heat proceeding exothermically due to the addition of a sufficient quantity of said agent thereto, said exothermic reaction reaching temperatures in the range of 160–210° F., the total amount of said agent employed being the alkaline equivalent of sodium hydroxide measuring approximately 2.5% of the combined weights of acetone and formaldehyde when the mole ratio of acetone to formaldehyde is 1 to 4, the resinous reaction product produced thereby being thermosetting, measuring by weight at least 75% of the combined weights of acetone and formaldehyde and being soluble in twice its volume of water.

6. The process for producing a resinous reaction product which comprises reacting under aqueous conditions, acetone and formaldehyde with the mole ratio of acetone to formaldehyde being 1 mole of acetone to about 3 to about 5 moles of formaldehyde by (I) adding to an aqueous mixture of said acetone and formaldehyde a quantity of a strongly alkaline reagent in quantity sufficient to initiate an exothermic reaction upon the application of external heat to said mixture and externally cooling said exothermically reacting mass, (II) adding another quantity of said reagent whereupon an exothermic reaction again ensues and cooling the exothermically reacting mass, (III) repeating (II) a number of times, controlling the cooling of (I), (II) and (III) whereby said exothermic reactions reach temperatures in the range of 160–210° F., the total amount of said agent employed being approximately the alkaline equivalent of sodium hydroxide measuring 1 to 3% of the combined weights of said acetone and formaldehyde when the mole ratio of acetone to formaldehyde is 1 to 3, 1.5 to 4% of the combined weights of acetone and formaldehyde when the mole ratio of acetone to formaldehyde is 1 to 4, and 2 to 6% of the combined weights of acetone and formaldehyde when the mole ratio of acetone to formaldehyde is 1 to 5, the resinous reaction product produced thereby being thermosetting, measuring by weight at least 75% of the combined weights of acetone and formaldehyde and being soluble in twice its volume of water.

7. The process for producing a resinous reaction product which comprises reacting under aqueous conditions, acetone and formaldehyde with the mole ratio of acetone to formaldehyde being 1 mole of acetone to about 4 moles of formaldehyde by (I) adding to an aqueous mixture of said acetone and formaldehyde a quantity of a strongly alkaline reagent in quantity sufficient to initiate an exothermic reaction upon the application of external heat to said mixture and externally cooling said exothermically reacting mass, (II) adding another quantity of said reagent whereupon an exothermic reaction again ensues and cooling the exothermically reacting mass, (III) repeating (II) a number of times, controlling the cooling of (I), (II) and (III) whereby said exothermic reactions reach temperatures in the range of 160–210° F., the total amount of said agent employed being approximately the alkaline equivalent of sodium hydroxide measuring 1.5 to 4% of the combined weights of acetone and formaldehyde when the mole ratio of acetone to formaldehyde is 1 to 4, the resinous reaction product produced thereby being thermosetting, measuring by weight at least 75% of the combined weights of acetone and formaldehyde and being soluble in twice its volume of water.

8. The process for producing a resinous reaction product which comprises reacting under aqueous conditions, acetone and formaldehyde with the mole ratio of acetone to formaldehyde being 1 mole of acetone to about 4 moles of formaldehyde by (I) adding to an aqueous mixture of said acetone and formaldehyde a quantity of a strongly alkaline reagent in quantity sufficient to initiate an exothermic reaction upon the application of external heat to said mixture and externally cooling said exothermically reacting mass, (II) adding another quantity of said reagent whereupon an exothermic reaction again ensues and cooling the exothermically reacting mass, (III) repeating (II) a number of times, controlling the cooling of (I), (II) and (III) whereby said exothermic reactions reach temperatures in the range of 160–210° F., the total amount of said agent employed being the alkaline equivalent of sodium hydroxide measuring approximately 2.5% of the combined weights of acetone and formaldehyde when the mole ratio of acetone to formaldehyde is 1 to 4, the resinous reaction product produced thereby being thermosetting, measuring by weight at least 75% of the combined weights of acetone and formaldehyde and being soluble in twice its volume of water.

References Cited in the file of this patent

UNITED STATES PATENTS

| Number | Name | Date |
| --- | --- | --- |
| 1,716,542 | Ellis | June 11, 1929 |
| 2,159,875 | Zwicky et al. | May 23, 1939 |
| 2,237,325 | Balz | Apr. 8, 1941 |
| 2,504,835 | Hewett et al. | Apr. 18, 1950 |

FOREIGN PATENTS

| Number | Country | Date |
| --- | --- | --- |
| 617,632 | Great Britain | Feb. 9, 1949 |